United States Patent
Hauser et al.

(10) Patent No.: US 10,272,883 B2
(45) Date of Patent: Apr. 30, 2019

(54) FIN RAY WIPER

(71) Applicant: Robert Bosch GmbH, Stuttgart (DE)

(72) Inventors: Florian Hauser, Achern (DE); Michael Weiler, Buehl (DE); Viktor Hackl, Sopron (DE); Waldemar Ernst, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/501,696

(22) PCT Filed: Jul. 10, 2015

(86) PCT No.: PCT/EP2015/065851
§ 371 (c)(1),
(2) Date: Feb. 3, 2017

(87) PCT Pub. No.: WO2016/020143
PCT Pub. Date: Feb. 11, 2016

(65) Prior Publication Data
US 2017/0232935 A1    Aug. 17, 2017

(30) Foreign Application Priority Data
Aug. 5, 2014   (DE) .................. 10 2014 215 427

(51) Int. Cl.
*B60S 1/34* (2006.01)
*B60S 1/38* (2006.01)

(52) U.S. Cl.
CPC .............. *B60S 1/3801* (2013.01); *B60S 1/345* (2013.01); *B60S 1/3427* (2013.01);
(Continued)

(58) Field of Classification Search
CPC .......... B60S 1/38; B60S 1/345; B60S 1/3452; B60S 1/3454; B60S 1/3436; B60S 1/344;
(Continued)

(56) References Cited

U.S. PATENT DOCUMENTS

| 2,499,809 | A | * | 3/1950 | Zaiger | ........................ | B60S 1/34 |
| | | | | | | 403/75 |
| 3,048,430 | A | | 8/1962 | Reese | | |
| 3,058,143 | A | * | 10/1962 | Bock | ........................ | B60S 1/34 |
| | | | | | | 15/250.34 |

(Continued)

FOREIGN PATENT DOCUMENTS

| CN | 1717350 A | 1/2006 |
| CN | 102015386 A | 4/2011 |

(Continued)

OTHER PUBLICATIONS

International Search Report for Application No. PCT/EP2015/065851 dated Oct. 1, 2015 (English Translation, 3 pages).

*Primary Examiner* — Gary K. Graham
(74) *Attorney, Agent, or Firm* — Michael Best & Friedrich LLP (57) ABSTRACT

The present invention relates to a window-wiping device (100) for a vehicle, comprising a wiper blade (2) having an elongate upper part (10) and an elongate lower part (12), which are designed to be at least partially flexible. Also provided is a plurality of connecting elements (18) for connecting the upper part (10) and the lower part (12), the connecting elements (18) being spaced apart along a longitudinal extent (8) of the wiper blade (2) and being attached to the upper part (10) and/or the lower part (12) by a rotary joint, and the connecting elements (18) being designed to allow a motion of the upper part (10) and the lower part relative to each other with a motion component along the longitudinal extent (8) of the wiper blade (2). The window-wiping device also has a wiper-blade-side fastening part (30), which is accommodated in the wiper blade head (70), and a fastening element (50), which can be attached to the drive shaft (33) and into which the wiper-blade-side fastening part (30) can be locked and which has an actuating device (21), which is designed to release the wiper-blade-side fastening part (30) from the fastening element (50) as a (Continued)

result of an actuation, wherein the actuating device (21) has a blocking element (22), which is designed to block actuation of the actuating device (21).

13 Claims, 7 Drawing Sheets

(52) U.S. Cl.
CPC ........... *B60S 1/3436* (2013.01); *B60S 1/3452* (2013.01); *B60S 1/3459* (2013.01); *B60S 1/3495* (2013.01); *B60S 2001/3812* (2013.01)

(58) Field of Classification Search
CPC .... B60S 1/3443; B60S 1/3459; B60S 1/3427; B60S 1/3801
USPC ...................................................... 15/250.34
See application file for complete search history.

(56) References Cited

U.S. PATENT DOCUMENTS

| | | | | |
|---|---|---|---|---|
| 6,026,536 A * | 2/2000 | Miller | ....................... | B60S 1/18 |
| | | | | 15/250.13 |
| 7,954,198 B2 * | 6/2011 | Renius | .................... | B60S 1/342 |
| | | | | 15/250.3 |
| 2016/0159322 A1 * | 6/2016 | Weiler | .................. | B60S 1/3411 |
| | | | | 15/250.32 |

FOREIGN PATENT DOCUMENTS

| | | | |
|---|---|---|---|
| DE | 3825322 | | 2/1990 |
| DE | 102011078108 | | 12/2012 |
| DE | 102013214064 | | 5/2014 |
| FR | 2821907 | | 9/2002 |
| JP | 2010-89574 | * | 4/2010 |
| WO | 2015071117 | | 5/2015 |

* cited by examiner

FIN RAY WIPER

BACKGROUND OF THE INVENTION

The invention relates to a window wiper device for a vehicle, in particular a motor vehicle.

Window wiper devices typically have a wiper arm or wiper lever, wherein a wiper blade is moved on the window of a motor vehicle. Here, the wiper blade is moved between a first reversal point and a second reversal point. For this purpose, the wiper arm is connected by way of a drive shaft to a wiper motor. In particular on windshields with intense changes in curvature, the wiper blade easily loses contact with the window. This can give rise, in particular in the case of intensely curved windows, to non-wiped wiping areas, and/or to smearing.

Since a wiping process must be optimized with regard to a multiplicity of parameters, such as for example an amount of rain falling on the window, a possible snow load on the window, the speed of the vehicle and associated wind pressure on the wiper arm, smearing cannot be reliably prevented simply by adapting the pressure of the wiper arm on the window. It is therefore a requirement to further improve window wiper devices.

SUMMARY OF THE INVENTION

For the improvement, there is a multiplicity of boundary conditions that must additionally be taken into consideration. Here, it is also a requirement to ensure or improve the handling or user-friendliness and a secure attachment of the wiper arm.

It is the object of the present invention to ensure reliable, substantially smear-free wiping of a window of a vehicle, with a secure attachment of the wiper arm of the window wiper device to a drive shaft of an associated drive unit being provided.

In one embodiment of the present invention, a window wiper device for a vehicle, in particular a motor vehicle, is proposed. The window wiper device comprises a wiper arm with a wiper blade with an elongate upper part and an elongate lower part which are at least partially of flexible form. Furthermore, multiple connecting elements for connecting the upper part and the lower part are provided, wherein the connecting elements are spaced apart from one another along a longitudinal extent of the wiper blade and are attached to the upper part and/or to the lower part by way of a rotary joint. The connecting elements are designed to permit a movement of the upper part and of the lower part relative to one another with a movement component along a longitudinal extent of the wiper blade.

The window wiper device furthermore comprises a wiper-blade-side fastening part which is accommodated in the wiper blade head and which is designed for connecting the wiper arm detachably to a drive shaft of a drive unit of the vehicle, and a fastening element which is attachable to the drive shaft and into which the wiper-blade-side fastening part can be engaged and which has an actuating device which is designed such that, when actuated, it releases the wiper-blade-side fastening part from the fastening element, wherein the actuating device has a blocking element which is designed to block an actuation of the actuating device.

Preferred embodiments and particular aspects of the invention will emerge from the dependent claims, from the drawings and from the present description.

According to the embodiments of the invention described here, it is possible for a window wiper device for vehicles to be produced in a particularly simple manner and for a multiplicity of different fields of use. Furthermore, the embodiments of the invention permit reliable, substantially smear-free wiping of a window of a vehicle, wherein a wiper arm of the window wiper device can be securely attached to a drive shaft of a wiper motor, and unauthorized removal of the wiper arm can be prevented.

In one embodiment of the present invention, a window wiper device for a vehicle, in particular a motor vehicle, is proposed. The window wiper device comprises a wiper arm with a wiper blade with an elongate upper part and an elongate lower part which are at least partially of flexible form. Furthermore, multiple connecting elements for connecting the upper part and the lower part are provided, wherein the connecting elements are spaced apart from one another along a longitudinal extent of the wiper blade and are attached to the upper part and/or to the lower part by way of a rotary joint. The connecting elements are designed to permit a movement of the upper part and of the lower part relative to one another with a movement component along a longitudinal extent of the wiper blade. The window wiper device furthermore comprises a wiper-blade-side fastening part which is accommodated in the wiper blade head and which is designed for connecting the wiper arm detachably to a drive shaft of a drive unit of the vehicle, and a fastening element which is attachable to the drive shaft and into which the wiper-blade-side fastening part can be engaged and which has an actuating device which is designed such that, when actuated, it releases the wiper-blade-side fastening part from the fastening element, wherein the actuating device has a blocking element which is designed to block an actuation of the actuating device.

In yet further embodiments, the blocking element may be in the form of a lock cylinder integrated into the actuating device. In this way, simple handling during the locking or securing of the entire wiper arm with wiper blade and wiper blade head on a drive shaft of a vehicle is ensured, in such a way that unauthorized removal of the wiper arm can be prevented.

In yet further embodiments, the blocking element may be in the form of a combination lock integrated into the actuating device. In this way, a coding of the actuating device can be performed so as to make it possible for the entire wiper arm with wiper blade and wiper blade head to be secured to the drive shaft of the vehicle by way of a numerical code or a numerical combination. Furthermore, in a further embodiment, a variant may be advantageous in which the blocking element is in the form of a rotary lock. In this way, the actuating device can be blocked by virtue of a movement of the actuating device, for example a pushing-in movement of the actuating device, for the release of the wiper arm from the fastening element being prevented.

In yet further embodiments, the fastening element may, together with the actuating device, be designed such that a non-positively locking and/or positively locking engagement action is releasably provided. In this way, simple handling during mounting and dismounting of the wiper arm is made possible. Since the actuating device is provided not on the wiper-blade-side fastening part but on the fastening element that can be attached to the drive shaft, the wiper blade device or the wiper blade can be designed in a particularly simple manner.

In yet further embodiments, the wiper-blade-side fastening part may be formed integrally with the wiper blade head of the window wiper device. In this way, manufacturing advantages are achieved because, for example, the wiper-blade-side fastening part can be formed in one piece, and/or the wiper-blade-side fastening part can be adapted so as to be formed by way of an injection molding process.

In yet further embodiments, the wiper-blade-side fastening part or the wiper blade may be provided by virtue of mechanical elements such as springs, spring elements, actuating devices and/or metallic elements being provided not in the fastening part but in a corresponding fastening element which can be attached to the drive shaft. It is furthermore advantageous that the blocking element for the locking or securing of the wiper arm to the drive shaft can be provided not in the wiper blade head but in the fastening element.

In yet further embodiments, the wiper-blade-side fastening part may have a hollow chamber, wherein furthermore, an opening is provided in a side wall of the hollow chamber, through which opening the actuating device projects or through which opening the actuating device can be actuated. It may be particularly expedient if the opening is arranged in a side wall, which faces toward a connecting element, of the hollow chamber.

In yet further embodiments, the wiper blade head and/or the wiper arm may comprise a material selected from the group comprising rubber, carbon, POM, PA, TPE, in particular TPE-S, TPE-O, TPE-U, TPE-A, TPE-V and TPE-E, or any combination thereof. In this way, the advantage is achieved that physical and in particular mechanical characteristics of the wiper arm integrally with the wiper-blade-side fastening part can be set by way of a suitable material selection.

It is also possible for the wiper arm or at least parts of the wiper arm to be formed as integral components in an injection molding process, whereby manufacturing advantages are achieved, which permit inexpensive production. Furthermore, the advantage can be achieved that the wiper-blade-side fastening part can be formed integrally with the wiper blade head of the window wiper device.

In yet further embodiments, the actuating device and/or the associated blocking element may be arranged between the wiper blade head and one of the multiple connecting elements. In this way, it is advantageously possible to realize simple actuation of the actuating device and/or of the associated blocking element, whereby the handling during mounting or dismounting of the wiper arm on or from the drive shaft is facilitated.

In yet further embodiments, the actuating device may, together with the blocking element, be designed such that, upon engagement of the wiper-blade-side fastening part into the fastening element attached to the drive shaft, the actuating device is automatically blocked by the blocking element. In this way, the advantage is achieved that it is necessary for the blocking element to be actuated, that is to say for example unlocked by way of a key, only in the event of the wiper arm being lifted off the drive shaft or lifted off the fastening element attached to the drive shaft.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1A:
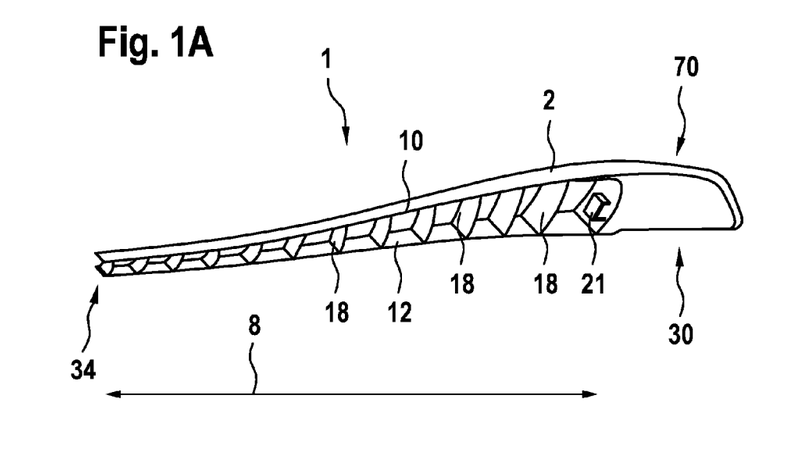
FIG. 1A is a perspective illustration of a wiper arm with wiper blade and wiper blade head and of a lockable or blockable actuating device, according to embodiments of the invention.

FIG. 1 is a schematic illustration of a wiper arm 1 of a window wiper device for a vehicle, in particular for a motor vehicle. The perspective illustration of FIG. 1 shows a wiper blade head 70 which can be lifted off a drive shaft of a window wiper drive unit of the vehicle and which is illustrated in a state in which it is engaged into an actuating device 21.

Such window wiper devices typically have no joint for the lifting of the wiper blade 2 or of a wiper lip from a window, for example a window of a motor vehicle. For example, the wiper blade 2 is released by way of a quick-action fastener (Quickfix) from a fastening element provided on the drive shaft.

In the wiper blade head 70 there is accommodated a wiper-blade-side fastening part 30 (not visible in FIG. 1A) which is designed for connecting the wiper arm 1 releasably to the drive shaft of the drive unit of the vehicle. An elongate upper part 10 and an elongate lower part 12, which are at least partially of flexible form, are connected to the wiper head 70. Multiple connecting elements 18 are provided for connecting the upper part 10 and the lower part 12, wherein the connecting elements 18 are spaced apart from one another along a longitudinal extent 8 of the wiper blade 2 and are attached to the upper part 10 and/or to the lower part 12 by way of a rotary joint.

The wiper-blade-side fastening part 30 is suitable for engaging into the fastening element that can be attached to the drive shaft. The drive-side fastening element may have the actuating device 21 which is designed such that, when actuated, it releases the wiper-blade-side fastening part 30 from the fastening element. In embodiments, the actuating device 21 can furthermore have a blocking element 22 which is designed to block an actuation of the actuating device 21. In this way, the actuating device 21 can be designed to be lockable.

The connecting elements 18 are designed such that they permit a movement of the upper part 10 and of the lower part 12 relative to one another with a movement component along a longitudinal extent 8 of the wiper blade 2. Here, the connecting elements are connected to the upper part 10 at a respective upper connecting position and to the lower part 12 at a respective lower connecting position. For example, in each case one rotary joint is provided at the connecting positions. In the event of a movement of the upper part 10 and of the lower part 12 relative to one another, the spacing of an upper connecting position relative to a lower connecting position on the same connecting element substantially does not change, that is to say that spacing is constant with deviations of for example ±1 mm, in particular ±0.3 mm.

Along the longitudinal extent 8 of the wiper blade 2, the spacing between the upper part 10 and the lower part 12 becomes smaller proceeding from the head 70 end, at least in regions of the longitudinal extent of the wiper blade 2 or over a predominant part of the longitudinal extent 8 of the wiper blade 2. Proceeding from the head end, the height of the wiper blade 2 tapers in wedge-shaped fashion in regions, or becomes smaller in regions of the longitudinal extent. For example, in embodiments, for a multiplicity of the connecting elements 18, the length of the connecting elements 18 may be provided such that the connecting elements provided in the vicinity of the wiper blade head 70 are longer than those at the opposite side 34 of the wiper blade 2 along the longitudinal extent 8.

Owing to these characteristics, a wiper blade 2 can be provided which functions in accordance with the fin-ray principle.

The wiper-plate-side fastening part 30 is accommodated in the wiper blade head 70 and is designed for releasably connecting the wiper arm 1 to the drive shaft of the drive unit (for example of a wiper motor) of the vehicle. The wiper blade head 70 and/or the wiper arm 1 may comprise a material selected from the group comprising rubber, carbon, POM, PA, TPE, in particular TPE-S, TPE-O, TPE-U, TPE-A, TPE-V and TPE-E, or any combination thereof. In this way, the advantage is achieved that physical and in particular mechanical characteristics of the wiper arm 1 integrally with the wiper-blade-side fastening part 30 and/or the wiper blade head 70 can be set by way of a suitable material selection.

Figure 1B:
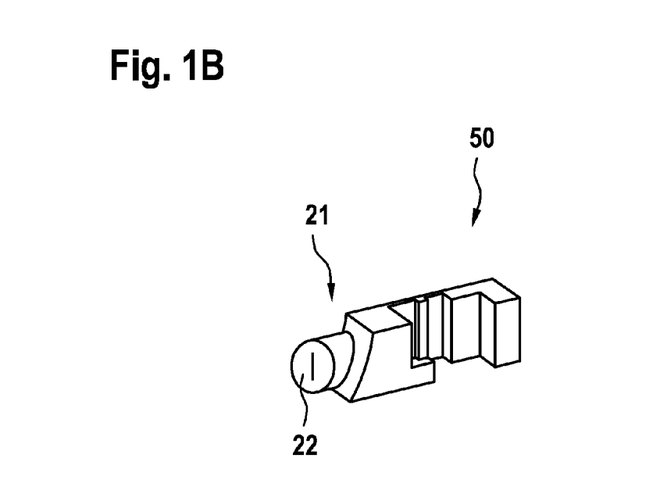
FIG. 1B is a perspective illustration of a fastening element for the wiper arm together with the actuating device shown in FIG. 1, according to embodiments of the invention.

FIG. 1B is a schematic illustration of a fastening element 50 for the wiper arm 1 together with the actuating device 21 shown in FIG. 1A.

In embodiments, the window wiper device furthermore has the fastening element 50 which can be attached to the drive shaft and into which the wiper-blade-side fastening part can be engaged and which has the actuating device 21, which actuating device is designed such that, when actuated, it releases the wiper-blade-side fastening part 30 from the fastening element 50. The actuation of the actuating device 21 can thus be prevented or blocked by way of the blocking element 22.

In embodiments, the blocking element 22 may be in the form of a lock cylinder integrated into the actuating device 21. In this way, simple handling during the locking or securing of the entire wiper arm 1 with wiper blade 2 and wiper blade head 70 on the drive shaft of a vehicle is ensured.

FIGS. 2A to 2D are schematic illustrations of individual steps for the mounting of the wiper blade 2 on the fastening element 50, wherein in particular, the fastening of the wiper blade 2, such as for example a Quickfix connection, according to embodiments is specified. The wiper arm 1 has a wiper blade head 70 in which the wiper-blade-side fastening part 30 is accommodated. The fastening part 30 comprises a hollow chamber with an opening 210. The fastening element 50 is provided on the drive shaft. The fastening element 50 comprises, for example, the actuating device 21.

Figure 2A:
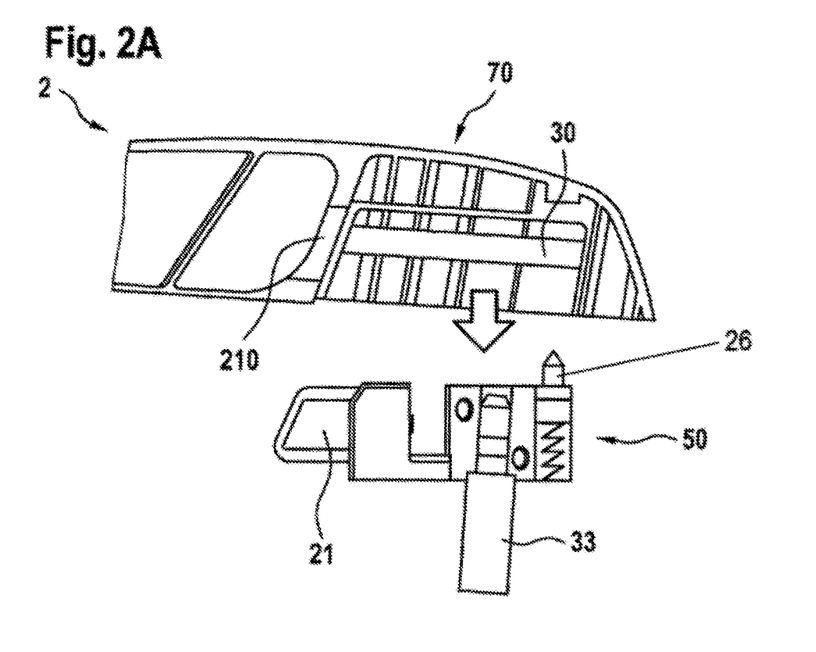
FIGS. 2A to 2D are schematic illustrations of the mounting of a wiper blade on a fastening element, wherein the wiper-blade-side fastening part and the drive-shaft-side fastening element are illustrated in more detail.
Figure 2B:
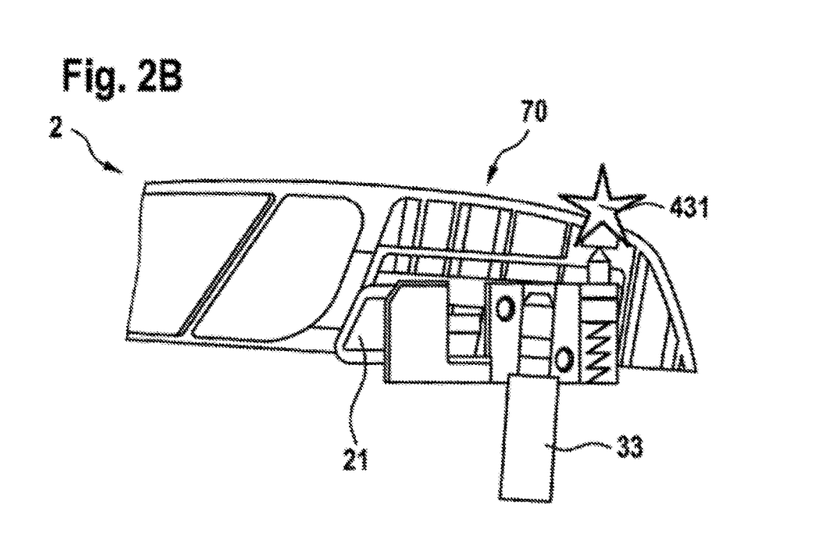
Figure 2C:
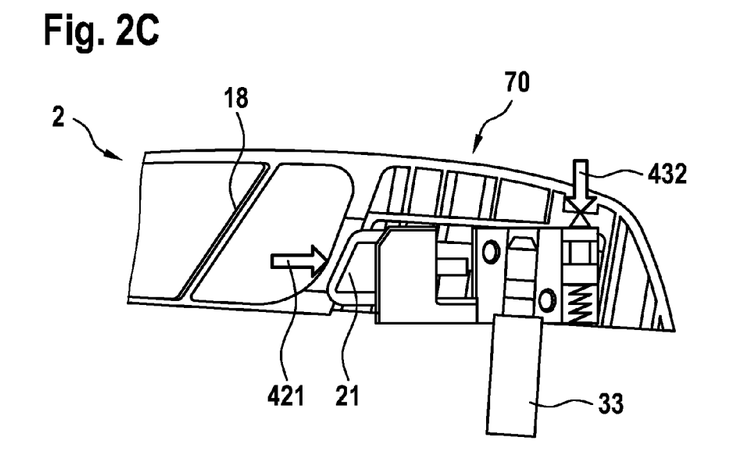

As illustrated by the arrow in FIG. 2A, the wiper blade is mounted by way of a translational movement or a linear movement. Here, the fastening part 30 is placed linearly onto the fastening element 50. In typical embodiments, the linear movement runs substantially along or parallel to the axis of the drive shaft. FIG. 2B shows how the fastening element 50 comes into contact with the corresponding contact position on the fastening part 30. This is schematically illustrated by way of a star 431. The actuating device 21 is, in FIG. 2B, already moving into a region of the opening 210. During a further progression of the translational movement as illustrated in FIG. 2C, the actuating device 21 is pressed (see arrow 421). A biased pin 26 whose end forms an abutment is likewise moved (see arrow 432).

Figure 2D:
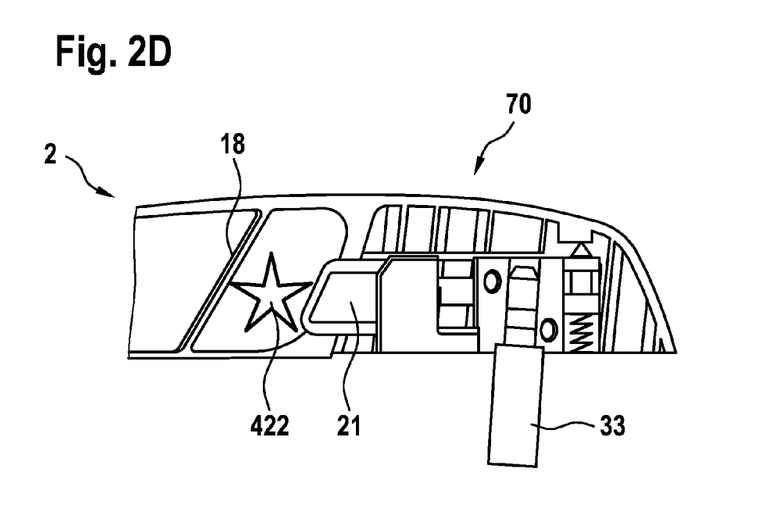

For the engagement action, the actuating device 21 moves into the opening 210. Said movement may be provided for example by way of a spring element. The engagement is schematically illustrated in FIG. 2D by a star 422.

The wiper-blade-side fastening part 30 may be formed integrally with the wiper blade head 70 and/or with the wiper blade 2 of the window wiper device. In this way, manufacturing-related advantages are achieved, for example because the wiper-blade-side fastening part 30 can be formed in one piece, and/or the wiper-blade-side fastening part 30 can be adapted so as to be formed by way of an injection molding process.

Aspects of an exemplary window wiper device for which the embodiments described herein of the window wiper device, in particular the described mounting and dismounting with a wiper-blade-side fastening part 30 and a drive-shaft-side fastening element 50, will be described below. The wiper arm 1 or the wiper blade 2 can in this case be provided in a particularly simple manner, wherein, for example, the wiper or the window wiper device which is mounted on a vehicle is composed exclusively of plastic. For example, the window wiper device may be provided without metal parts and/or without mechanical elements.

In some embodiments of the present invention, a spring may be provided in the actuating device 21. An actuation or pushing-in movement of the actuating devices 21 may, in embodiments, be prevented or blocked in order to prevent the wiper arm 1 from being lifted off fastening element 50 in an unauthorized manner. Such a blocking action may be realized in a variety of ways by way of the blocking element 22, as will be discussed below with reference to FIGS. 3A, 3B, 4A and 4B.

In further embodiments, the fastening element 50 may, together with the actuating device 21, be designed such that a non-positively locking and/or positively locking engagement action is releasably provided. Since the actuating device 50 is provided not on the wiper-blade-side fastening part 30 but on the fastening element 50 that can be attached to the drive shaft, the wiper arm 1 together with the wiper blade 2 and the wiper blade head 70 can be designed in a particularly simple manner.

In yet further embodiments, the wiper-blade-side fastening part 30 or the wiper arm 1 may be provided by virtue of mechanical elements such as springs, spring elements, actuating devices and/or metallic elements being provided not in the fastening part 30 but in a corresponding fastening element 50. The fastening part 30 is thus adapted so as to be provided in an injection molding process, in particular in a single injection molding process or in an injection molding process with one step. For example, the fastening part 30 is composed of only one material. It is optionally possible for formations such as guide rails or a contact position to be provided in the single material. In this way, simple handling during mounting and dismounting of the wiper arm is made possible.

Figure 3A:
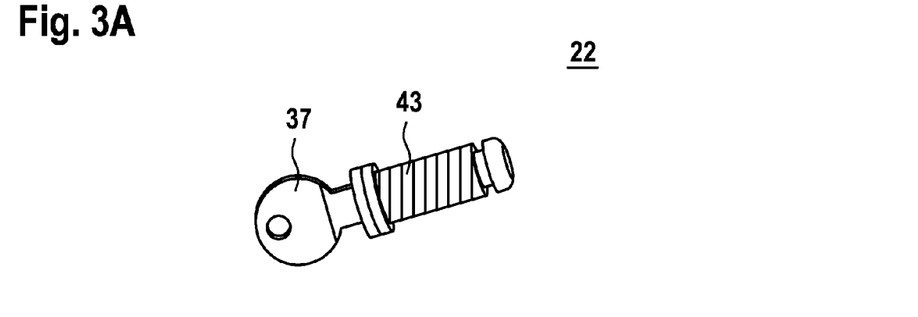
FIGS. 3A and 3B are perspective illustrations of a blocking element which can be used for the blocking of the actuating device, according to embodiments of the invention.
Figure 3B:
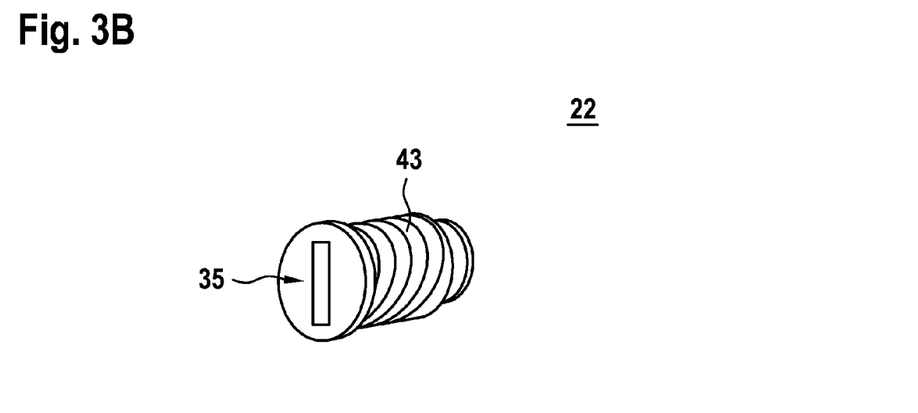

FIGS. 3A and 3B are perspective illustrations of the blocking element 22 which can be used for the blocking of the actuating device 21, according to embodiments described herein. Here, the blocking element 22 is in the form of a lock cylinder 43 inserted into the actuating device 21, in such a way that, by way of a key 37 that can be inserted into an opening 35, the lock cylinder 41 can be locked and thus a movement of the actuating device 21, for example a pushing-in movement thereof for the release of the wiper arm 1, can be blocked or prevented. In this way, the advantage is achieved that individual wiper arms 1 can be attached to the associated drive shaft and are thus secured for example against theft. For the closure of the blocking element 22 and/or for the mounting/dismounting of the respective wiper arm 1 on/from the fastening element 50, it is possible for suitably shaped tools, strippers, pins, lifting means etc. to be provided instead of a key 37. Furthermore, the blocking element 22 and the actuating device 21 may form an integrated unit.

In yet further embodiments, the actuating device 21 may, together with the blocking element 22, be designed such that, upon engagement of the wiper-blade-side fastening part 30 into the fastening element 50 attached to the drive shaft, the actuating device 21 is automatically blocked by the blocking element 22. Here, it is necessary for the blocking element 22 to be unlocked, for example by way of a key 37, only when the wiper arm 1 is lifted off the drive shaft or off the fastening element 50 attached to the drive shaft.

Figure 4A:
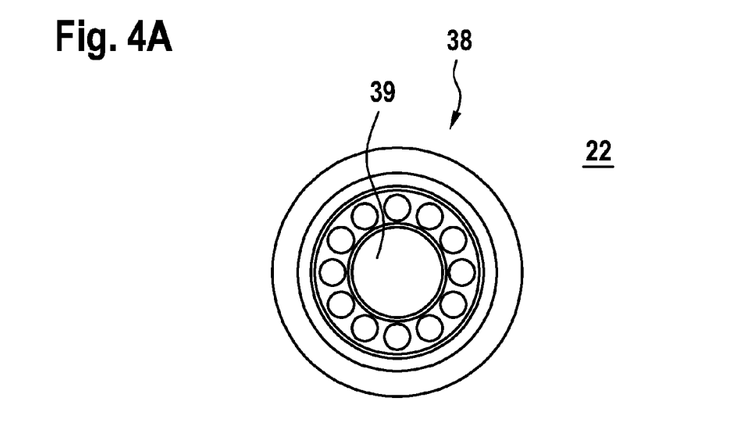
FIGS. 4A and 4B are perspective illustrations of further blocking elements which can be used for the blocking of the actuating device, according to further embodiments of the invention.
Figure 4B:
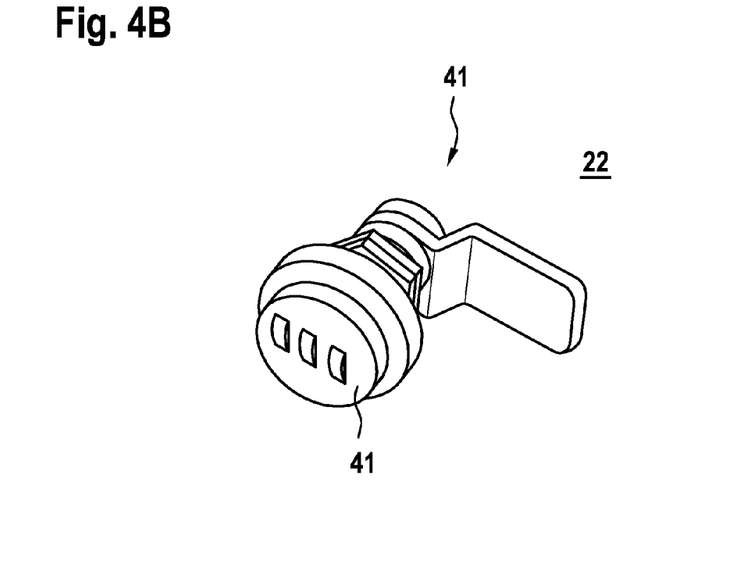

FIGS. 4A and 4B are perspective illustrations of further blocking elements 22 that can be used for the blocking of the actuating device 21, according to further embodiments. Here, the blocking element 22 may be in the form of a combination lock 38, 40 integrated into the actuating device 21. In this way, a coding of the actuating device 21 can be performed so as to make it possible for the entire wiper arm 1 with wiper blade 2 and wiper blade head 70 to be secured to the drive shaft of the vehicle by way of a numerical code or a numerical combination. In the variant illustrated in FIG. 4A, the blocking element 22 is in the form of a rotary lock 38 which serves for blocking the actuating device 21 by virtue of a movement of the actuating device 21, for example a pushing-in movement of the actuating device 21, for the release of the wiper arm 1 from the fastening element being prevented. The rotary lock 38 may have a rotary disk 39 by way of which a numerical combination can be set.

The blocking element 22 illustrated in FIG. 4B is in the form of a combination lock 40. A release of the actuating device 21 by the blocking element 22 is possible for example only with a particular numerical combination which is set at a coding unit 41, such that individual wiper arms 1 can be attached to the associated drive shaft and secured against theft. In this way, the advantage is achieved that locking or securing of the respective wiper arm 1 is possible even without keys or suitably shaped tools, strippers, pins, lifting means etc.

Below, a description will be given of aspects of an exemplary window wiper device for which the embodiments of the window wiper device described herein, in particular the blockable actuating devices described herein, are particularly advantageous.

Figure 5A:
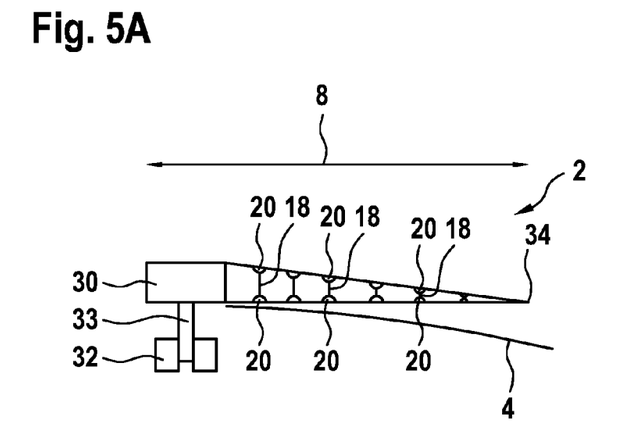
FIG. 5A is a schematic illustration of a further exemplary embodiment of a window wiper device according to the invention in the form of a wiper arm with integrated wiper blade in a basic position.
Figure 5B:
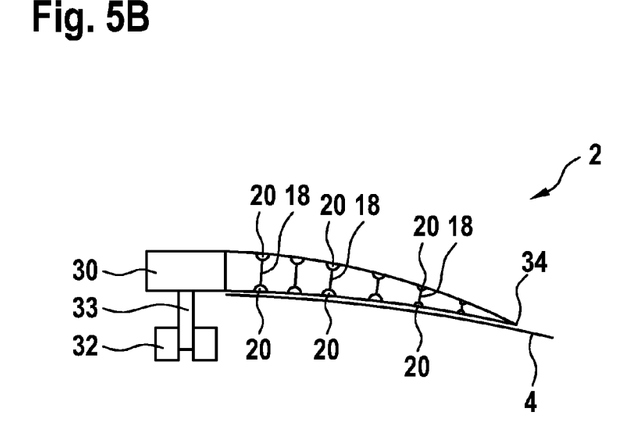
FIG. 5B is a schematic illustration of the wiper arm with integrated wiper blade as per FIG. 5A in a position placed against a window.

FIGS. 5A and 5B are schematic illustrations of a wiper blade 2 in a basic position and in a position placed against a window according to embodiments of the window wiper device of the disclosure. Here, fin-ray wipers are described, for which blockable actuating devices 21 according to the embodiments described here are particularly expedient. The blockable actuating devices 21 are not illustrated again in FIGS. 5A, 5B, 6 and 7, and may also be provided in these embodiments as described above. The wiper blade 2 serves for wiping a window 4 of a vehicle, which is for example a motor vehicle, in particular an automobile. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are, or may be designed as, flexible beams. It is likewise possible for only in each case one part of the upper part 10 and/or of the lower part 12 to be designed to be flexible. In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum flexural stiffness is thus realized.

The upper part 10 and the lower part 12 are fastened to the wiper-blade-side fastening part 30. The window wiper device may be connected by way of the wiper-blade-side fastening part 30 for example to a Quickfix fastening on the vehicle or to the drive spindle of a window wiper drive unit (wiper motor) of the vehicle. A Quickfix fastening of said type can rapidly detachably connect the drive shaft 33 of the window wiper device to the wiper arm 1.

At the side situated opposite the fastening part 30 along the longitudinal extent of the window wiper device, the upper part 10 and the lower part 12 are connected at a connecting position 34. The upper part 10 and the lower part 12 are connected to one another by connecting elements 18. The connecting elements 18 are designed such that the spacing of the connecting position to the upper part 10 and the spacing of the connecting position to the lower part 12 changes by at most +/−1 mm, in particular by at most +/−0.3 mm (for example as a result of thermal expansion and/or tension and/or compressive loading). The connecting elements 18 may thus substantially be of inelastic form, or the effect of the connecting elements 18 is based on their transmission of force between upper part 10 and lower part 12, and not on their elasticity.

The connecting elements 18 are fastened by way of rotary joints 20 to inner longitudinal sides, which face toward one another, of the upper part 10 and of the lower part 12. Here, the rotary joints 20 are hinges. In particular, the rotary joints 20 may be in the form of film hinges. This is advantageous in particular if the upper part 10, lower part 12 and/or connecting elements 18 are produced from a plastics material or are lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

Embodiments in which the joints are provided by way of film hinges thus provide a very simple way of providing the joints for a fin-ray wiper. The wiper blade 2 may be provided in unipartite, in particular ready-from-the-mold form. In typical embodiments, the film hinges exhibit high extensibility. This may be achieved for example by way of a material selected from the group PP, PE, POM and PA. Alternatively, the film hinges may be produced from one or more materials from a group comprising: TPE (thermoplastic elastomer), for example TPE-S, TPE-O, TPE-U, TPE-A, TPE-V and TPE-E.

The connecting elements 18 are spaced apart from one another along the longitudinal extent 8 of the wiper blade 2. The spacings are advantageously less than 50 mm, in particular less than 30 mm. In this way, it is possible to ensure a particularly high level of flexibility of the window wiper device, in particular of its lower part 12, and good adaptation to the curvature and changes in curvature of the window 4 to be wiped.

FIG. 5B is a schematic illustration of the wiper blade 2 as per FIG. 5A in a position placed against the window 4. Since the window 4 has a curvature, it is the case that, when the wiper blade 2 bears against the window 4, contact pressure forces act on the lower part 12. Since the upper part 10 and the lower part 12 are flexible beams and the connecting elements 18 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the window 4.

Owing to the construction of the embodiments described here, it is the case that, when a force is exerted on the lower part 12 (by the window 4), the lower part 12 bends in the direction from which the force acts. This is realized by way of the connection of the upper part 10 and of the lower part 12 at the connecting position 34, the shape, and by way of rotary joints at the connection between the connecting elements 18 and the upper part and lower part. A window wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a window wiper device according to the embodiments described herein has the advantage of improved adaptation to a window 4 of a motor vehicle. In the case of a conventional window wiper blade, the upper part thereof is conventionally rigid, that is to say is not designed to be flexible.

Figure 6:
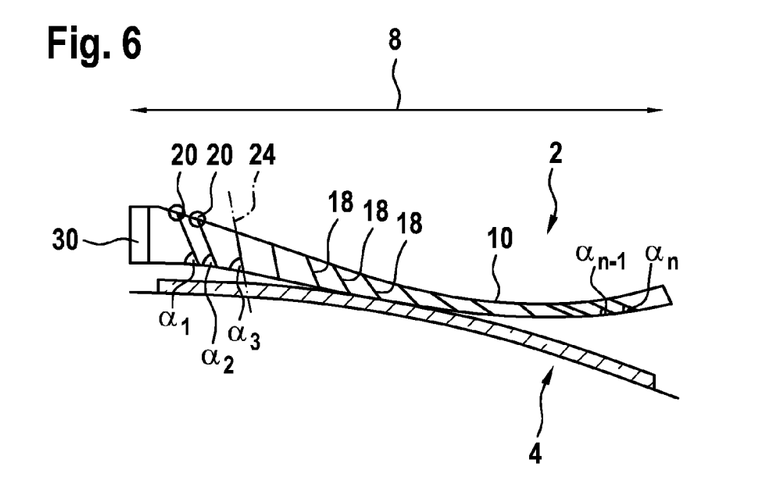
FIG. 6 is a schematic illustration of a wiper blade according to embodiments of the present invention in a basic position.
Figure 7:
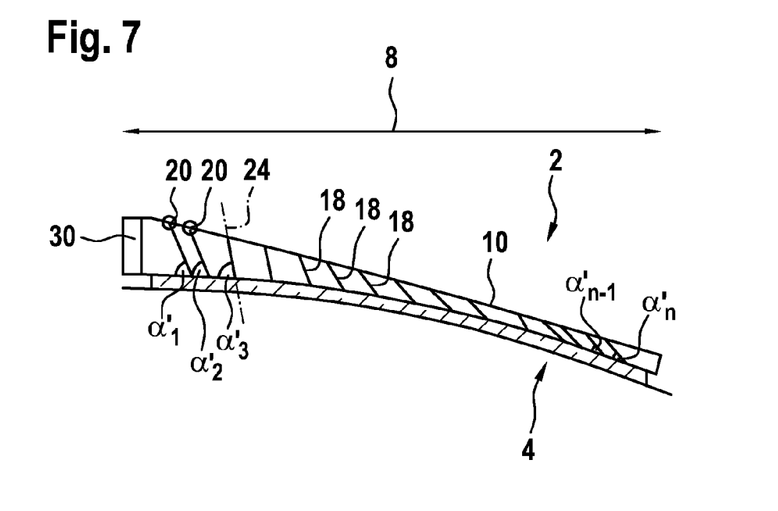
FIG. 7 is a schematic illustration of a wiper blade according to embodiments of the present invention in a position placed against a window.

FIGS. 6 and 7 shows schematic illustrations of a wiper blade 2 of a window wiper device for a vehicle, in particular for a motor vehicle, in a basic position (FIG. 6), that is to say in an unloaded state, and in a position placed against a window 4 (FIG. 7), as per the embodiments described herein. The wiper blade 2 comprises an elongate upper part 10 and an elongate lower part 12 which are at least partially of flexible form. Furthermore, multiple connecting elements 18 for connecting the upper part 10 and the lower part 12 are provided, wherein the connecting elements 18 are spaced apart from one another along the longitudinal extent 8 of the wiper blade 2. The connecting elements 18 are designed to permit a movement of the upper part 10 and of the lower part 12 relative to one another with a movement component along the longitudinal extent 8 of the wiper blade 2. Furthermore, the connecting elements 18 are arranged relative to the lower part 12 such that, in an unloaded state of the wiper blade 2, an angle $\alpha_n$ of the respective longitudinal axes 24 of the connecting elements 18 relative to the lower part 12 varies, in particular varies in continuous fashion or varies monotonously or strictly monotonously, along at least a part of the longitudinal extent 8 of the wiper blade 2.

In the wiper blade 2 illustrated in FIG. 6 in the unloaded state, the angles $\alpha_n$ of the respective longitudinal axes 24 of the connecting elements 18 relative to the lower part 12, which vary along the longitudinal extent 8 of the wiper blade 2, are denoted by $\alpha_1, \alpha_2, \alpha_3, \ldots, \alpha_{n-1}, \alpha_n$. In a loaded state of the wiper blade 2, that is to say in a position placed against the window 4, as is illustrated by way of example in FIG. 7, the angles $\alpha_n$ of the respective longitudinal axes 24 of the connecting elements 18 relative to the lower part 12 change in relation to the unloaded state. To express this, the angles $\alpha_n$ of the respective longitudinal axes 24 of the connecting elements 18 relative to the lower part 12 which vary along the longitudinal extent 8 of the wiper blade 2 are, in the wiper blade illustrated in FIG. 7 which is in a position placed against the window, denoted by $\alpha'_1, \alpha'_2, \alpha'_3, \ldots, \alpha'_{n-1}, \alpha'_n$.

In embodiments of the window wiper device that may be combined with other embodiments, the wiper blade 2 has at least one first region in which the angle $\alpha_n$ of the longitudinal axes 24 of the connecting elements 18 relative to the lower part 12 decreases, in particular monotonously, in particular strictly monotonously, along the longitudinal extent 8 of the wiper blade 2 toward a wiper blade end. Furthermore, the wiper blade 2 may have at least one second region in which the angle $\alpha_n$ of the longitudinal axis 24 of the connecting elements 18 relative to the lower part 12 increases, in particular monotonously, in particular strictly monotonously, along the longitudinal extent 8 of the wiper blade 2 toward a wiper blade end. In embodiments illustrated by way of example in FIGS. 6 and 7, the second region of the wiper blade, in which the angle $\alpha_n$ of the longitudinal axes 24 of the connecting elements 18 relative to the lower part 12 increases along the longitudinal extent 8 of the wiper blade 2 toward a wiper blade end is arranged at an inner position of the wiper blade which is situated in the vicinity of the fastening part 30 of the wiper blade 2. In this way, a window wiper device can be provided which permits a particularly good adaptation to the curvature of a window 4. Furthermore, a substantially uniform contact pressure of the window wiper device against the window 4, and also a homogeneous force distribution of the window wiper device, can be provided, such that a high level of wiping quality is provided.

In embodiments of the wiper blade 2 that may be combined with other embodiments, the connecting elements 18 are, in particular in an unloaded state of the wiper blade 2, fastened to the lower part 12 such that the longitudinal axes 24 of the connecting elements 18 run at angles $\alpha_n$ with respect to the lower part 12 which lie between a lower angle limit value $\alpha_{nu}$ and an upper limit value $\alpha_{no}$. In embodiments, the lower angle limit value is $\alpha_{nu}=10°$, in particular $\alpha_{nu}=15°$, in particular $\alpha_{nu}=20°$, and the upper angle limit value is $\alpha_{no}=80°$, in particular $\alpha_{no}=90°$, in particular $\alpha_{no}=100°$. This advantageously ensures a particularly good transmission of a force acting on the lower part 12 to the upper part 10.

In embodiments of the window wiper device that may be combined with other embodiments, the connecting elements 18 are configured such that the spacing between the upper part 10 and the lower part 12 varies at least along a part of the longitudinal extent 8 of the wiper blade 2, in particular decreases in continuous fashion in a first region and increases in continuous fashion in a second region. The spacing between the upper part 10 and the lower part 12 may also, along the longitudinal extent 8 of the wiper blade 2, comprise a region in which the spacing between the upper part 10 and the lower part 12 is substantially constant along the longitudinal extent 8 of the wiper blade 2. The spacing between the upper part 10 and the lower part 12 is greater at the fastening part 30 than at the opposite end, at which the connecting position 34 is situated.

In embodiments of the wiper blade 2 that may be combined with other embodiments, the inner spacing value (facing toward the fastening part) is at least 15 mm, in particular at least 25 mm, in particular at least 35 mm. In embodiments that may be combined with other embodiments, the outer spacing value is at least 10 mm, in particular at least 12.5 mm, in particular at least 15 mm. In embodiments that may be combined with other embodiments, the mean a spacing value is at least 7.5 mm, in particular at least 9 mm, in particular at least 12.5 mm.

As illustrated by way of example in FIGS. 6 and 7, in embodiments that may be combined with other embodiments, the connecting elements 18 are articulatedly connected to the lower part 12 and/or to the upper part 10. In particular, the connecting elements 18 are connected to the lower part 12 and/or to the upper part 10 by way of a first film hinge 20. The first film hinge 20 may be formed in one piece with the connecting element 18 and with the upper part 10 and/or with the lower part 12. The unipartite form of the film hinges permits simple and inexpensive production.

In embodiments of the wiper blade that may be combined with other embodiments described herein, the wiper blade comprises a first region with a first curvature ω<0 and a second region with a second curvature ω>0. Furthermore, in embodiments, the wiper blade may have a third region with a third curvature ω<0, wherein the second region of the wiper blade with the second curvature ω>0 is arranged between the first region with the first curvature ω<0 and the third region with the third curvature ω<0, as shown by way of example in FIG. 6. It is thus possible to provide a window wiper device with which a substantially uniform contact pressure against the window 4 can be realized. Furthermore, a window wiper device can be provided which exhibits improved adaptation to the window 4 and a high level of wiping quality.

In further embodiments, in addition to a Quickfix fastener that can be used for fin-ray wipers, in the case of which fastener the entire window wiper device is removed from a drive shaft 33 on the vehicle, a mechanism may be provided for the purposes of raising the wiper blade 2 of a window wiper device from the window 4 and setting said wiper blade down. This further simplifies usage, for example for manual cleaning of the window.

What is claimed is:

1. A window wiper device for a vehicle, comprising a wiper arm (1) with a wiper blade head (70) and a wiper blade (2), which comprises
   an elongate upper part (10) which is at least partially of flexible form,
   an elongate lower part (12) which is at least partially of flexible form, and
   multiple connecting elements (18) connecting the upper part (10) and the lower part (12), wherein the connecting elements (18) are spaced apart from one another along a longitudinal extent (8) of the wiper blade (2) and are attached to the upper part (10) and/or to the lower part (12) by way of a rotary joint, wherein the connecting elements (18) are configured to permit a movement of the upper part (10) and of the lower part (12) relative to one another with a movement component along the longitudinal extent (8) of the wiper blade (2), and
   wherein the window wiper device furthermore comprises:
   a wiper-blade-side fastening part (30) which is accommodated in the wiper blade head (70) and which is configured for connecting the wiper arm (1) detachably to a drive shaft (33) of a drive unit (32) of the vehicle, and
   a fastening element (50) which is attachable to the drive shaft (33) and into which the wiper-blade-side fastening part (30) can be engaged and which has an actuating device (21) which is configured such that, when actuated, the actuating device releases the wiper-blade-side fastening part (30) from the fastening element (50), wherein the actuating device (21) has a blocking element (22) which is configured to block an actuation of the actuating device (21), wherein the wiper-blade-side fastening part (30) has a hollow chamber and has an opening (210) arranged in a side wall of the hollow chamber, wherein the opening (210) is arranged in a side wall of the hollow chamber which faces toward the connecting elements (18).

2. The window wiper device as claimed in claim 1, wherein the blocking element (22) is in the form of a lock cylinder (43) integrated into the actuating device (21).

3. The window wiper device as claimed in claim 1, wherein the blocking element (22) is in the form of a combination lock (40) integrated into the actuating device (21).

4. The window wiper device as claimed in claim 1, wherein the blocking element (22) is in the form of a rotary lock (38) integrated into the actuating device (21).

5. The window wiper device as claimed in claim 1, wherein the wiper-blade-side fastening part (30) is formed integrally with the wiper blade head (70) of the window wiper device.

6. The window wiper device as claimed in claim 1, wherein the wiper blade head (70) comprises a material selected from the group comprising rubber, carbon, POM, PA, TPE, or any combination thereof.

7. The window wiper device as claimed in claim 1, wherein the actuating device (21) and/or the associated blocking element (22) is arranged between the wiper blade head (70) and one of the multiple connecting elements (18).

8. A method for dismounting a window wiper device for a vehicle as claimed in claim 1, comprising:
   releasing the blocking element (22), and
   actuating the actuating device (21) for the purposes of separating the wiper-blade-side fastening part from the fastening element.

9. The window wiper device as claimed in claim 1, wherein the wiper blade head (70) comprises a material selected from the group comprising rubber, carbon, POM, PA, TPE-S, TPE-O, TPE-U, TPE-A, TPE-V and TPE-E, or any combination thereof.

10. A window wiper device for a vehicle, comprising a wiper arm (1) with a wiper blade head (70) and a wiper blade (2), which comprises
- an elongate upper part (10) which is at least partially of flexible form,
- an elongate lower part (12) which is at least partially of flexible form, and
- multiple connecting elements (18) connecting the upper part (10) and the lower part (12), wherein the connecting elements (18) are spaced apart from one another along a longitudinal extent (8) of the wiper blade (2) and are attached to the upper part (10) and/or to the lower part (12) by way of a rotary joint, wherein the connecting elements (18) are configured to permit a movement of the upper part (10) and of the lower part (12) relative to one another with a movement component along the longitudinal extent (8) of the wiper blade (2), and
- wherein the window wiper device furthermore comprises:
  - a wiper-blade-side fastening part (30) which is accommodated in the wiper blade head (70) and which is configured for connecting the wiper arm (1) detachably to a drive shaft (33) of a drive unit (32) of the vehicle, and
  - a fastening element (50) which is attachable to the drive shaft (33) and into which the wiper-blade-side fastening part (30) can be engaged and which has an actuating device (21) which is configured such that, when actuated, the actuating device releases the wiper-blade-side fastening part (30) from the fastening element (50), wherein the actuating device (21) has a blocking element (22) which is configured to block an actuation of the actuating device (21), wherein the blocking element is a combination lock (40) and is integrated into the actuating device (21).

11. A window wiper device for a vehicle, comprising a wiper arm (1) with a wiper blade head (70) and a wiper blade (2), which comprises
- an elongate upper part (10) which is at least partially of flexible form,
- an elongate lower part (12) which is at least partially of flexible form, and
- multiple connecting elements (18) connecting the upper part (10) and the lower part (12), wherein the connecting elements (18) are spaced apart from one another along a longitudinal extent (8) of the wiper blade (2) and are attached to the upper part (10) and/or to the lower part (12) by way of a rotary joint, wherein the connecting elements (18) are configured to permit a movement of the upper part (10) and of the lower part (12) relative to one another with a movement component along the longitudinal extent (8) of the wiper blade (2), and
- wherein the window wiper device furthermore comprises:
  - a wiper-blade-side fastening part (30) which is accommodated in the wiper blade head (70) and which is configured for connecting the wiper arm (1) detachably to a drive shaft (33) of a drive unit (32) of the vehicle, and
  - a fastening element (50) which is attachable to the drive shaft (33) and into which the wiper-blade-side fastening part (30) can be engaged and which has an actuating device (21) which is configured such that, when actuated, the actuating device releases the wiper-blade-side fastening part (30) from the fastening element (50), wherein the actuating device (21) has a blocking element (22) which is configured to block an actuation of the actuating device (21), wherein the blocking element is a rotary lock and is integrated into the actuating device (21).

12. A window wiper device for a vehicle, comprising a wiper arm (1) with a wiper blade head (70) and a wiper blade (2), which comprises
- an elongate upper part (10) which is at least partially of flexible form,
- an elongate lower part (12) which is at least partially of flexible form, and
- multiple connecting elements (18) connecting the upper part (10) and the lower part (12), wherein the connecting elements (18) are spaced apart from one another along a longitudinal extent (8) of the wiper blade (2) and are attached to the upper part (10) and/or to the lower part (12) by way of a rotary joint, wherein the connecting elements (18) are configured to permit a movement of the upper part (10) and of the lower part (12) relative to one another with a movement component along the longitudinal extent (8) of the wiper blade (2), and
- wherein the window wiper device furthermore comprises:
  - a wiper-blade-side fastening part (30) which is accommodated in the wiper blade head (70) and which is configured for connecting the wiper arm (1) detachably to a drive shaft (33) of a drive unit (32) of the vehicle, and
  - a fastening element (50) which is attachable to the drive shaft (33) and into which the wiper-blade-side fastening part (30) can be engaged and which has an actuating device (21) which is configured such that, when actuated, the actuating device releases the wiper-blade-side fastening part (30) from the fastening element (50), wherein the actuating device (21) has a blocking element (22) which is configured to block an actuation of the actuating device (21), wherein the fastening element includes a biased pin configured to be pressed along a first direction upon attachment of the wiper blade head (70) onto the fastening element (50), and wherein the actuating device (21) is configured to move along a second direction when activated, the second direction being perpendicular to the first direction.

13. The window wiper device according to claim 12, wherein the second direction extends parallel to a longitudinal extent of the wiper blade head (70).

* * * * *